UNITED STATES PATENT OFFICE.

SAMUEL FINKELSTEIN, OF HARRISBURG, PENNSYLVANIA.

PROCESS OF RECOVERING WASTE PAPER.

936,106.  Specification of Letters Patent.  Patented Oct. 5, 1909.

No Drawing.  Application filed March 15, 1909.  Serial No. 483,550.

*To all whom it may concern:*

Be it known that I, SAMUEL FINKELSTEIN, a subject of the Czar of Russia, residing at Harrisburg, in the county of Dauphin and State of Pennsylvania, have invented new and useful Improvements in Processes of Recovering Waste Paper, of which the following is a specification.

This invention relates to a process of recovering old printed paper, such as newspaper, saturated with ink, oil and other substances difficult to remove.

So far as I am aware no way of treating old newspaper—paper, which has been printed upon—has been heretofore devised by which the ink, oil and other foreign substances contained therein may be removed to make a pulp stock of original or pristine whiteness. On this account waste paper of this character has been used only for the production of common wrapping paper in which whiteness of color is not a material factor.

The object of my invention is to provide a process by which old printed paper may be reconverted into clear white pulp from which all the ink, oil, etc., have been removed, thus enabling the stock to be used again for the production of paper of the same degree of whiteness as the original.

In carrying my invention into practice, I first take the old printed paper and grind it into pulp, and then place it in a bath of boiling water for a period of about an hour, by which all the free oil, pigment and gummy matter is extracted therefrom and rises to the top of the bath in the form of scum which is removed. If desired, these first two steps may be simultaneously performed, that is to say, the stock may be ground while being boiled in the hot water bath. The pulp is then removed and placed in a boiling hot bath of water, hyposulfite of soda and oil of vitriol, about four ounces of the hyposulfite of soda and one ounce of oil of vitriol being commonly used to each gallon of water. The action of this bath or solution extracts the remaining pigments and other foreign matter and bleaches the pulp to its original whiteness. An hour's treatment in this bath is usually sufficient for the purpose. The pulp is then washed in a bath of clear water and is ready for use as stock for the production of "news" paper of the usual color and quality.

By means of this process old printed and discolored paper may be easily, quickly and cheaply converted into pulp of first quality, thereby enabling pulp made from waste paper of this character ordinarily used for the manufacture of low grade paper to be employed for the production of paper of the same quality into which it was originally made.

Having thus fully described the invention, what is claimed as new, is:—

1. The process of converting printed paper stock into clear pulp of original color, which consists in first reducing the stock to pulp, boiling the pulp in water, then boiling it in a solution of water, hyposulfite of soda and oil of vitriol, and then washing it in clear water.

2. The process of converting printed paper into clear pulp of original color, which consists in reducing the stock to pulp, then treating it in a bath of boiling water to remove the gummy constituents, then subjecting it to the action of a bleaching solution to remove the coloring matter, and then washing it in clear water.

3. The process of converting printed paper into clear pulp of original color, which consists in reducing the paper to pulp, boiling it in hot water to remove the gummy constituents, subjecting it to the action of a boiling solution of water, hyposulfite of soda and oil of vitriol, in the proportions of four ounces of hyposulfite of soda and one ounce of oil of vitriol to each gallon of water, and then washing it in clear water.

4. The process of converting printed paper into clear pulp of original color, which consists in reducing the paper to pulp, boiling the pulp in a hot water bath for a period of about one hour, bleaching the pulp in a boiling solution of water, hyposulfite of soda and oil of vitriol in the proportions of four ounces of hyposulfite of soda and one ounce of oil of vitriol to each gallon of water for a period of about one hour, and then washing the pulp with clear water.

In testimony whereof I affix my signature in presence of two witnesses.

SAMUEL FINKELSTEIN.

Witnesses:
C. C. HINES,
JOSEPH COPLINSKY.